US 12,267,592 B2

(12) United States Patent
Igarashi

(10) Patent No.: US 12,267,592 B2
(45) Date of Patent: Apr. 1, 2025

(54) PROCESSING APPARATUS FOR GENERATING MOVIE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Yuka Igarashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 18/308,119

(22) Filed: Apr. 27, 2023

(65) Prior Publication Data

US 2023/0362491 A1 Nov. 9, 2023

(30) Foreign Application Priority Data

May 6, 2022 (JP) .................. 2022-076703

(51) Int. Cl.
*H04N 23/69* (2023.01)
*H04N 23/611* (2023.01)
*H04N 23/661* (2023.01)
*H04R 3/00* (2006.01)

(52) U.S. Cl.
CPC ........... *H04N 23/69* (2023.01); *H04N 23/611* (2023.01); *H04N 23/661* (2023.01); *H04R 3/005* (2013.01)

(58) Field of Classification Search
CPC .... H04N 23/69; H04N 23/611; H04N 23/661; H04N 23/633; H04R 3/005
See application file for complete search history.

(56) References Cited

U.S. PATENT DOCUMENTS

| | | | |
|---|---|---|---|
| 2006/0227224 A1 | 10/2006 | Kawata et al. | |
| 2022/0345813 A1* | 10/2022 | Stein | G10L 19/008 |
| 2023/0217113 A1* | 7/2023 | Nalluri | H04L 65/40 |
| | | | 348/14.08 |
| 2023/0282224 A1* | 9/2023 | Chun | G10L 21/0232 |
| | | | 381/56 |

FOREIGN PATENT DOCUMENTS

| | | |
|---|---|---|
| JP | 2006-314078 A | 11/2006 |
| JP | 5773960 B2 | 9/2015 |

* cited by examiner

*Primary Examiner* — Christopher K Peterson
(74) *Attorney, Agent, or Firm* — Cowan, Liebowitz & Latman, P.C.

(57) ABSTRACT

A processing apparatus that generates a movie in which hearing states of sounds from sound sources are linked to a looking state of an image during zoom image capturing. Sounds are collected by sound collection devices. A video image is captured by an image capturing device. Position information of a sound source with respect to the image capturing device is obtained. A control unit determines an estimated standing position at which a looking state becomes equivalent to a captured image when an image capturing field angle is changed, and determines a direction and volume in synthesizing the sounds based on the estimated standing position. The control unit determines the direction coincident with a direction of the sound source viewed from the estimated standing position, and determines the volume so as to increase as a distance from the estimated standing position to the sound source decreases.

14 Claims, 11 Drawing Sheets

PROCESSING APPARATUS FOR GENERATING MOVIE, CONTROL METHOD THEREFOR, AND STORAGE MEDIUM STORING CONTROL PROGRAM THEREFOR

BACKGROUND OF THE INVENTION

Field of the Invention

The present invention relates to a processing apparatus for generating a movie, a control method thereof, and a storage medium storing a control program thereof.

Description of the Related Art

There is an increasing demand for a movie with which a user can enjoy high presence as if the user were on an actual place without going to the actual place. As one of techniques for generating such a movie, there is a known technique for generating a stereo reproduction sound in accordance with a captured video image to enhance the presence.

For example, Japanese Patent Publication No. 5773960 discloses a technique that rotates a stereo sound generated from recorded sounds of microphones installed at different positions according to a pan angle of a camera, amplifies a sound at a center position of a captured image according to zoom information, and synthesizes the amplified sound to the rotated stereo sound. Moreover, Japanese Laid-Open Patent Publication No. 2006-314078 (JP2006-314078A, one of two priorities of US20060227224A1) discloses a technique that collects sounds of channels having different directional characteristics from built-in microphones, receives a sound signal from an external sound collection device through wireless communication, and determines at least one channel to which the received sound signal is synthesized on the basis of a zoom magnification. JP 2006-314078A further discloses a technique that synthesizes the sound signal received through the wireless communication to a channel to which a sound from a direction close to the incoming direction of the radio wave is assigned.

However, in the techniques disclosed in the above patent publications, when there are sound sources at different positions, the direction of each sound source perceived from the image may not match the direction of the sound source perceived from the sound during zoom image capturing.

SUMMARY OF THE INVENTION

The present invention provides a technique that generates a movie in which hearing states of sounds from sound sources are linked to a looking state of an image during zoom image capturing.

Accordingly, an aspect of the present invention provides a processing apparatus including a sound obtainment unit configured to obtain sounds collected by sound collection devices, an image obtainment unit configured to obtain a video image captured by an image capturing device, a position obtainment unit configured to obtain position information of a sound source, which is subjected to a sound collection by each of the sound collection devices, with respect to the image capturing device, and a control unit configured to determine a position of a viewer as an estimated standing position at which a looking state becomes equivalent to an image captured by the image capturing device when an image capturing field angle of the image capturing device is changed, and to determine a direction and volume in synthesizing the sounds obtained by the sound obtainment unit based on the determined estimated standing position. The control unit determines the direction so as to coincide with a direction in which the sound source is located viewed from the estimated standing position, and determines the volume so as to increase as a distance from the estimated standing position to the sound source decreases.

According to the present invention, it is possible to generate a movie in which the hearing states of the sounds from the sound sources are linked to the looking state of the image during the zoom image capturing.

Further features of the present invention will become apparent from the following description of exemplary embodiments with reference to the attached drawings.

DESCRIPTION OF THE EMBODIMENTS

Figure 1A:
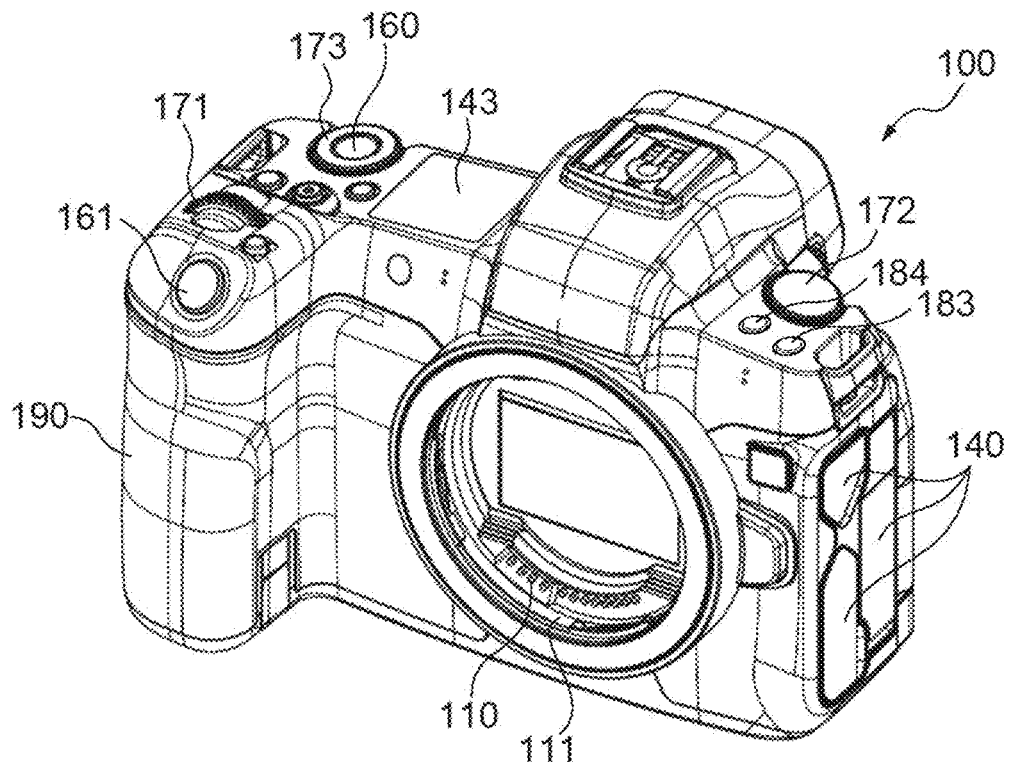
FIG. 1A and FIG. 1B are external perspective views showing a digital camera according to an embodiment.

Hereafter, embodiments according to the present invention will be described in detail by referring to the drawings. In the description, a "video image" means a moving image excluding a sound, and a "movie" means data obtained by synthesizing a sound to a video image. Hereinafter, a so-called digital camera (an image capturing apparatus) is shown as an example of a processing apparatus in first and second embodiments mentioned later according to the present invention.

Figure 1B:
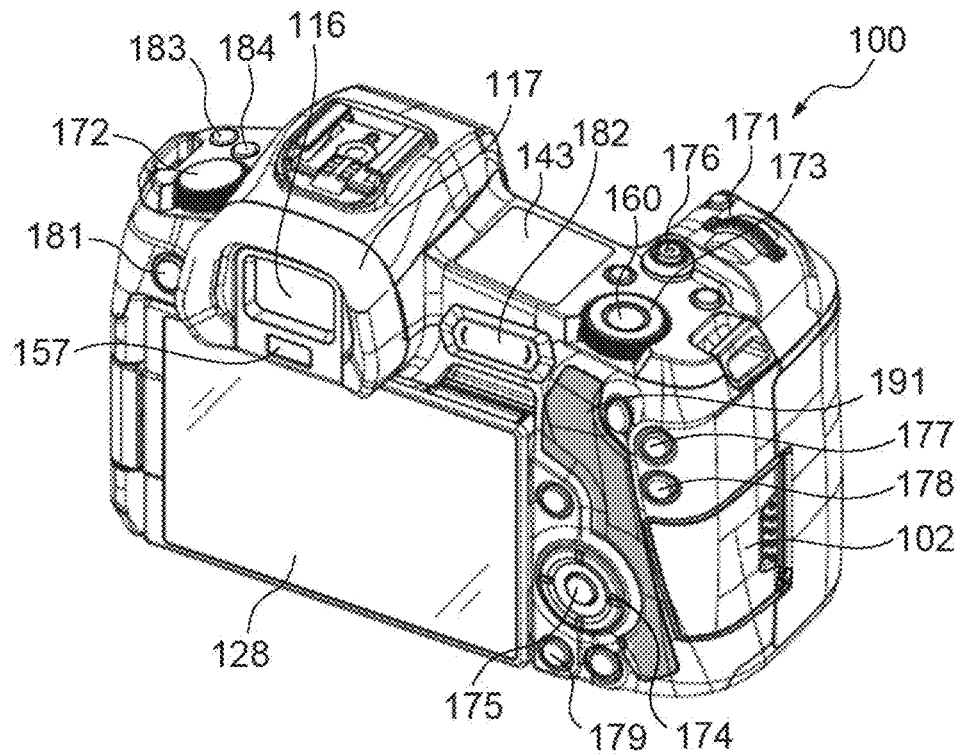

FIG. 1A is an external perspective view showing the digital camera 100 of the embodiment in viewing from a diagonal front. FIG. 1B is an external perspective view showing the digital camera 100 in viewing from a diagonal rear.

The digital camera 100 includes a lens mount 111, a camera-side communication terminal 110, a grip part 190, a shutter button 161, a main electronic dial 171, a mode change switch 160, a sub electronic dial 173, and an out-of-finder display unit 143. The digital camera 100 also includes a power switch 172, a volume change mode button 183, a direction change mode button 184, a contact cover 140, a display unit 128, a touch panel 170a, a four-direction key 174, a SET button 175, and a video button 176. The digital camera 100 further includes an AE lock button 177, an enlargement button 178, a reproduction button 179, a menu button 181, a touch bar 182, an eyepiece unit 116, an eyepiece finder 117, an eye-approach detection unit 157, a lid 102, and a thumb rest part 191.

Figure 2:
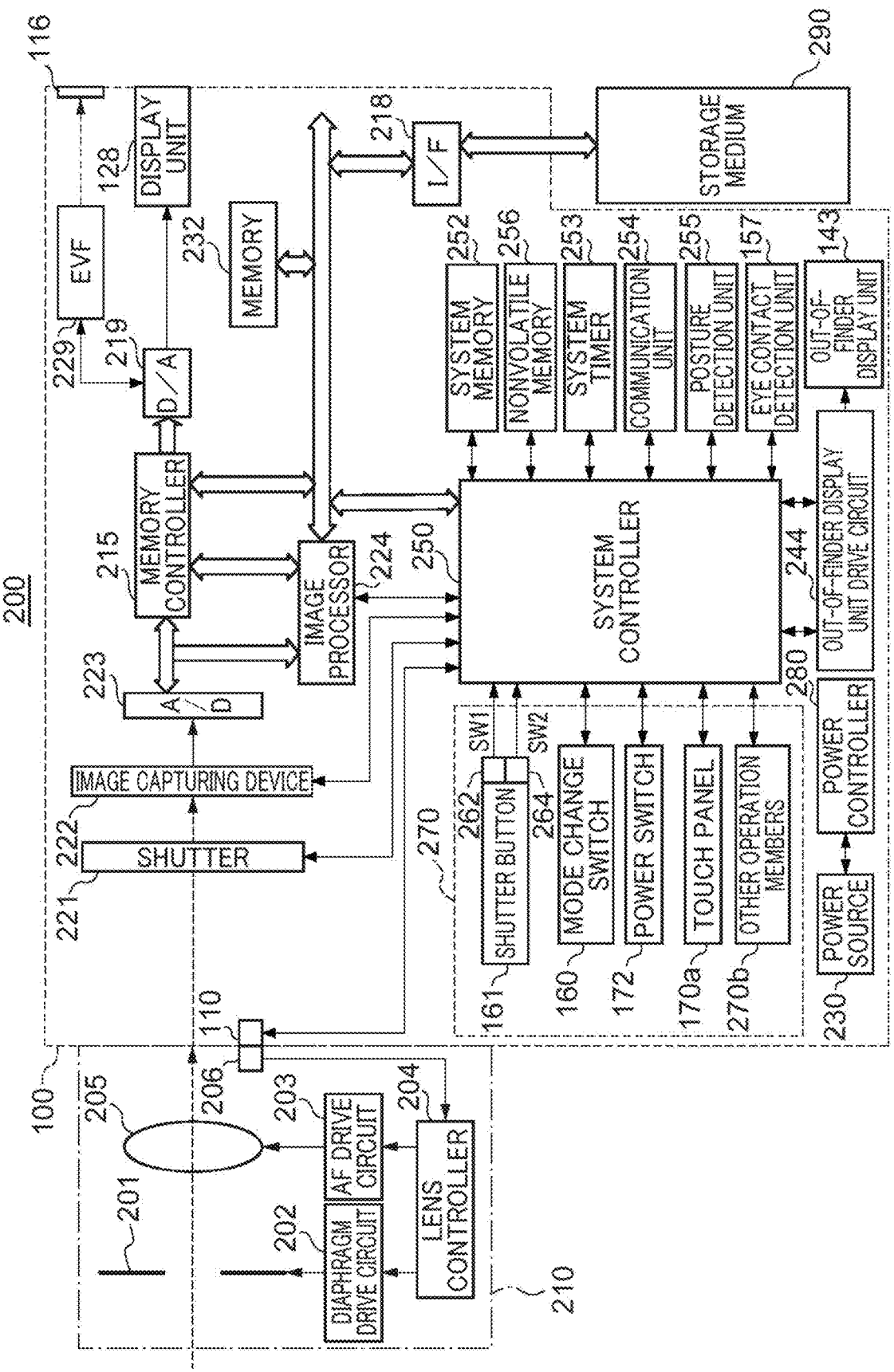
FIG. 2 is a block diagram showing a schematic configuration of a camera system.

The lens mount 111 allows to attach and retouch various lens barrels like a lens barrel 210 (see FIG. 2). The camera side communication terminal 110 is provided inside the lens mount 111, and is electrically connected to the lens side communication terminal 206 of the lens barrel 210 when the lens barrel 210 is mounted on the lens mount 111. The grip part 190 has a shape that allows a user to firmly hold the digital camera 100 with a right hand and is formed on the right side when the digital camera 100 is viewed from the rear side.

The shutter button 161 is an operation member for instructing a system controller 250 (see FIG. 2) to perform image pickup preparing operations, such as an AF (autofocus) operation, an AE (automatic exposure) operation, and an image capturing operation by an image capturing device 222 (see FIG. 2). The main electronic dial 171 is a rotational operation member for changing setting values, such as a shutter speed and an aperture value. The shutter button 161 and the main electronic dial 171 are provided at positions that enables operations by an index finger of a right hand in a state where the user grips the grip part 190 by a little finger, ring finger, and middle finger of the right hand.

The mode change switch 160 is an operation member for selecting an operation mode from among a still image capturing mode, a video image capturing mode, and a reproduction mode. It should be noted that the operation mode may be selected by displaying an operation mode list screen on the display unit 128 in response to an operation to the mode change switch 160 and by designating any one of the displayed modes with another operation member.

The sub electronic dial 173 is a rotational operation member that instruct to move a selection frame (cursor), to feed an image, etc. The sub electronic dial 173 is provided at a position that enables an operated by a thumb of the right hand in the state where the user grips the grip portion 190 by the little finger, ring finger, and middle finger of the right hand. The out-of-finder display unit 143 is, for example, a liquid crystal panel or the like and displays setting values, such as a shutter speed and an aperture value.

The power switch 172 is an operation member for switching ON/OFF of the power of the digital camera 100. The volume change mode button 183 and the direction change mode button 184 are operation members for switching output sound generation modes during zoom shooting. The output sound generation modes include a volume change mode and a direction change mode. Details of these modes will be described later. The volume change mode button 183 is an operation member (a first switching member) for switching ON (valid)/OFF (invalid) of the volume change mode. The direction change mode button 184 is an operation member (a second switching member) for switching ON/OFF of the direction change mode. The terminal cover 140 protects a connector (not shown) connected to a connection cable (not shown) for connecting the digital camera 100 to an external device.

The display unit 128 is, for example, a liquid crystal panel, an organic EL panel, or the like, and displays images and various types of information. A touch panel 170a is provided on a display surface of the display unit 128, and the display surface of the display unit 128 is a touch operation surface. An input coordinate on the touch panel 170a is associated with a display coordinate on the display surface of the display unit 128. The system controller 250 detects various touch operations on the touch operation surface and executes processes corresponding to the detected touch operations. Thus, a GUI is realized as if an object displayed on the display unit 128 can be directly operated. The four-direction key 174 is an operation member having four (upper, lower, left, and right) portions that can be pressed. The system controller 250 executes a process corresponding to the pressed portion. The SET button 175 is an operation member mainly for determining a selection item etc.

The video button 176 is an operation member for instructing the system controller 250 to start and stop video image capturing (video image recording). The AE lock button 177 is an operation member for fixing an exposure state. The enlargement button 178 is an operation button for switching ON/OFF of an enlargement mode of live view display (LV display) during the image capturing. By operating the main electronic dial 171 in a state where the enlargement mode is ON, a user can enlarge or reduce an LV image (an image that is LV-displayed). In the reproduction mode, the enlargement button 178 is used as an operation member for enlarging a reproduced image or changing a magnification.

The reproduction button 179 is an operation button for switching the operation mode from the still image capturing mode or the video image capturing mode to the reproduction mode. In the reproduction mode, the latest image among images stored in a storage medium 290 (see FIG. 2) can be displayed on the display unit 128. The menu button 181 is an operation member for instructing the system controller 250 to display a menu screen on the display unit 128. The user can intuitively perform various settings of the digital camera 100 using the four-direction key 174, the SET button 175, and the menu screen displayed on the display unit 128 by pressing the menu button 181.

The touch bar 182 (multifunction bar: M-Fn bar) is a line-shaped operation member (line touch sensor) capable of accepting touch operations, such as a tap operation and a lateral slide operation. The tap operation is a finger operation to touch and release within a predetermined time without sliding. The slide operation is a finger operation to touch and slide while keeping a touched state. The touch bar 182 is provided at a position that enables a touch operation by the thumb of the right hand in the state where the user grips the grip portion 190 by the little finger, ring finger, and middle finger of the right hand. That is, the touch bar 182 is disposed at the position that enables an operation in a state (shooting posture) where the user is ready to press the shutter button 161 at any time while bringing their eye close to the eyepiece unit 116 and visually recognizing an electric view finder (EVF) 229 (see FIG. 2) provided in the eyepiece 116. The touch bar 182 does not have a display function.

The eyepiece section 116 is included in the eyepiece finder 117 (a look-in viewfinder). The user can visually recognize an image displayed on the built-in EVF 229 through the eyepiece section 116. The eye-approach detection unit 157 is a sensor that detects whether the user's eye is approaching the eyepiece section 116. Details of the eye-approach detection unit 157 will be described later.

The lid 102 is a member that covers a slot (not shown) into which the storage medium 290 is inserted. The thumb rest part 191 is provided at a position (thumb standby position) on the back side of the digital camera 100 where the thumb of the right hand gripping the grip part 190 can be easily placed in a state where any operation member is not operated. The thumb rest portion 191 is formed of a rubber member or the like in order to enhance holding force (grip feeling).

FIG. 2 is a block diagram schematically showing a configuration of a camera system 200 that is formed by combining a lens barrel 210 to the digital camera 100. The members that are shown in FIG. 1A and FIG. 1B among members shown in the block diagram in FIG. 2 are denoted by the same reference numerals, and the descriptions thereof are omitted 121 in principle.

The lens barrel 210 includes a lens 205, a lens-side communication terminal 206, a diaphragm 201, a diaphragm drive circuit 202, an AF drive circuit 203, and a lens controller 204.

The lens 205 is usually constituted by a plurality of lenses, but only one is schematically shown in FIG. 2. The lens 205 includes at least a focus lens and a zoom lens. The lens-side communication terminal 206 is electrically connected to the camera-side communication terminal 110 when the lens barrel 210 is attached to the digital camera 100 to enable communication between the system controller 250 and the lens controller 204. The diaphragm 201 adjusts the amount of incident light passing through the lens barrel 210. The diaphragm drive circuit 202 drives the diaphragm 201. The AF drive circuit 203 moves the focus lens in a direction of an image-capturing optical axis so as to focus on an object. The lens controller 204 controls operations of the diaphragm drive circuit 202 and the AF drive circuit 203 in accordance with commands from the system controller 250 and returns control results to the system controller 250.

The digital camera 100 includes a shutter 221, an image capturing device 222, an A/D convertor 223, an image processor 224, a memory controller 215, a memory 232, a D/A convertor 219, the display unit 128, the EVF 229, the eyepiece section 116, and the system controller 250. The digital camera 100 also includes a nonvolatile memory 256, a system memory 252, a system timer 253, a communication unit 254, a posture detection unit 255, an eye-approach detection unit 157, an out-of-finder display unit 143, and an out-of-finder display unit drive circuit 244. The digital camera 100 further includes a power controller 280, a power source 230, a storage medium I/F 218, a storage medium 290, and an operation unit 270. The operation unit 270 includes the shutter button 161, the mode change switch 160, the power switch 172, the touch panel 170a, and other operation members 270b.

The shutter 221 is specifically a focal plane shutter, and its operation is controlled by the system controller 250 to control exposure time in the image capturing device 222. The image capturing device 222 is an image sensor, such as a CCD sensor or a CMOS sensor, and may include an imaging plane phase difference sensor that outputs defocus amount information to the system controller 250. The A/D converter 223 converts an analog signal (imaging signal) output from the image capturing device 222 into a digital signal (image data). The image processor 224 applies predetermined processes (resizing processes, such as pixel interpolation and reduction, a color conversion process, etc.) to image data received from the A/D converter 223 and image data received from the memory controller 215.

The image processor 224 performs a predetermined calculation process using the image data received from the A/D converter 223, and performs an auto white balance (AWB) process of a TTL system based on an obtained calculation result. The image processor 224 further applies the predetermined calculation process to the image data received from the A/D converter 223, and the system controller 250 performs exposure control and distance measurement control based on a calculation result. This enables executions of an AF process, an AE process, an EF (electronic flash pre-emission) process, etc. of the TTL system.

The image data output from the A/D converter 223 is written to the memory 232 via the image processor 224 and memory controller 215. Alternatively, the image data may be written to the memory 232 via the memory controller 215 without passing through the image processor 224. The memory 232 further stores image date (display image date) used for display on the display unit 128 and the EVF 229. The memory 232 has a storage capacity sufficient to store a predetermined number of still images, a predetermined time of video image and sound. The memory 232 also serves as an image display memory (a video memory).

The D/A convertor 219 converts the display image read from the memory 232 into an analog signal and supplies the analog signal to the display unit 128 or the EVF 229. As a result, an image is displayed on the display unit 128 or the EVF 229. The EVF 229 is a liquid-crystal panel, an organic EL panel, or the like. The digital signals A/D-converted by the A/D converter 223 and stored in the memory 232 are converted into the analog signals by the D/A converter 219. The analog signals are sequentially transferred to the display unit 128 or the EVF 229. As a result, LV display can be performed.

The system controller 250 is what is called a microcomputer equipped with at least one processor. The nonvolatile memory 256 is a storage unit capable of electrically erasing and storing data, and is an EEPROM, for example. The nonvolatile memory 256 stores constants, variables, programs, etc. for operations of the system controller 250. The system memory 252 is a RAM, for example.

The system controller 250 reads the constants, variables, programs, etc. for operations of the system controller 250 from the nonvolatile memory 256 and develops them to the system memory 252. Then, the system controller 250 performs entire control of the digital camera 100 by running the programs. In addition, the system controller 250 develops predetermined programs stored in the nonvolatile memory 256 to the system memory 252 and performs various processes described later by referring to flowcharts. The system controller 250 also performs display control by controlling the memory 232, the D/A convertor 219, the display unit 128, the EVF 229, etc.

The system timer 253 measures time used for various kinds of control and time of a built-in clock. The communication unit 254 transmits and receives a video signal and a sound signal to and from an external device connected to be communicable by wireless or wired connection. Specifically, the communication unit 254 connects the digital camera 100 to a communication network like the Internet or an external device via 4G, 5G, Wi-Fi (trademark), LAN, Bluetooth (trademark), Bluetooth Low Energy, or the like.

A captured image (including an LV image) captured by the image capturing device 222 and image data stored in the storage medium 290 can be transmitted from the digital camera 100 to an external device via the communication unit 254. To the contrary, the digital camera 100 can obtain image data and other various types of information from the external device.

In the present embodiment, the communication unit 254 receives and obtains sounds collected by external microphones (a first microphone 302 and a second microphone 305 (see FIG. 3A)). In addition, the communication unit 254 receives position information detected by external position sensors (a first position sensor 303 and a second position sensor 306 (see FIG. 3A)). In the meantime, the communication unit 254 outputs a movie generated by the digital camera 100 to the external device (not shown).

The posture detection unit 255 is an acceleration sensor, a gyro sensor, or the like, and detects the posture of the digital camera 100 with respect to the direction of gravity. Based on a posture detected by the posture detection unit 255, it is possible to determine whether the image is captured by the image capturing device 222 while holding the digital camera 100 horizontally or vertically. The system controller 250 can add posture information corresponding to the posture of the digital camera 100 detected by the posture detection unit 255 to the image file, and the image can be recorded after rotation. It should be noted that the posture detection unit 255 can also detect movements of the digital camera 100 (panning, tilting, lifting, being stationary, etc.).

The eye-approach detection unit 157 is, for example, an infrared proximity sensor, and detects approach and separation of a user's eye (or approach and separation of an object) with respect to the eyepiece section 116. When an eye (object) approaches the eyepiece section 116, infrared light projected from a light projecting unit (not shown) of the eye-contact detection unit 157 is reflected by the eye (object), and the reflected light is received by a light receiving unit (not shown) of the eye-contact detection unit 157. At this time, it is possible to determine whether the eye (object) is approaching the eyepiece section 116 according to an amount of infrared light received by the light receiving unit.

The system controller 250 switches states of the display unit 128 and the EVF 229 between a display state and a non-display state according to the detection result of the eye-approach detection unit 157. For example, the digital camera 100 shall be in an image capturing standby state and a switching setting of a display destination shall be an automatic switching. In such a case, when it is determined that the eye is approaching the eyepiece section 116, the display unit 128 is brought into the display state and the EVF 229 is brought into the non-display state. In the meantime, when it is determined that the eye is not approaching the eyepiece section 116, the display unit 128 is brought into the non-display state and the EVF 229 is brought into the display state.

The out-of-finder display unit drive circuit 244 displays various kinds of information on the out-of-finder display unit 143 according to instructions from the system controller 250. The power controller 280 includes a battery detection circuit, a DC-DC converter, a switch circuit that switches an energization block, etc. The power controller 280 detects presence of a battery, a battery type, battery residual, etc. The power controller 280 controls the DC-DC converter on the basis of the detection result and an instruction from the system controller 250, and supplies a necessary voltage to the sections including the storage medium 290 in a necessary period. The power source 230 is a primary battery, such as an alkaline battery or a Li battery, a secondary battery, such as a NiCd battery, a NiMH battery, or a Li ion battery, or an AC adapter.

The storage medium 290 is a memory card, a hard disk, a magnetic disk, or the like that stores still image data and video image data. The storage medium I/F 218 is an interface that enables communication between the system controller 250 and the storage medium 290. It should be noted that the storage medium 290 may be detachable from the digital camera 100 or may be built in the digital camera 100 (may not be detachable).

The operation unit 270 receives user's operations and inputs various operation instructions according to the user's operations to the system controller 250. The other operation members 270b included in the operation unit 270 include the main electronic dial 171, sub electronic dial 173, four-direction key 174, and SET button 175. The other operation members 270b further include the video button 176, AE lock button 177, enlargement button 178, reproduction button 179, menu button 181, and touch bar 182.

The shutter button 161 includes a first shutter switch 262 and a second shutter switch 264. The first shutter switch 262 is turned on in the middle of operation (what is called half press) of the shutter button 161, and thereby a first shutter switch signal SW1 (an image capturing preparation instruction) is generated. The system controller 250 executes image capturing preparing operations, such as an AF process, an AE process, an AWB process, and an EF process, in response to the first shutter switch signal SW1. The second shutter switch 264 is turned on when the operation of the shutter button 161 is completed (what is called full press), and thereby a second shutter switch signal SW2 (an image capturing instruction) is generated. The system controller 250 executes a series of image capturing operations from reading signals from the image capturing device 222 to writing image data to the storage medium 290 in response to the second shutter switch signal SW2.

Next, a movie generation process executed by the camera system 200 will be described. Hereinafter, an aspect in which a music event is captured and a movie is generated will be described. The generated movie data can be used as movie data for (simultaneous) distribution via the Internet, movie data for DVD software, or the like.

Figure 3A:
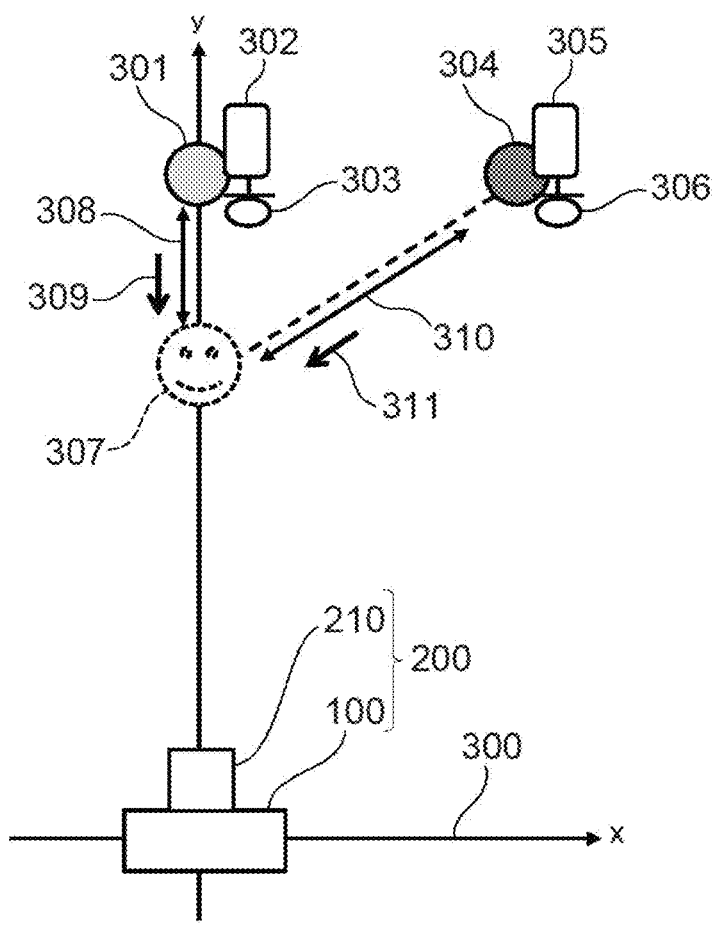
FIG. 3A is a schematic view showing a positional relationship between sound sources and a camera system.

FIG. 3A is a schematic view showing a positional relationship between the camera system 200 and sound sources. The digital camera 100 is arranged at an origin of a coordinate system 300 and generates video images by capturing states of performances of a first player 301 and a second player 304. Hereinafter, there are the two players in this example for convenience of description, but there may be one player or more than two players.

A field angle center axis of the digital camera 100 shall coincide with a y-axis positive direction of the coordinate system 300. Further, the first player 301 and the second player 304 are sound sources. The first microphone 302, which is a sound collection device, is mounted on or disposed near the first player 301, collects the sound of the performance of the first performer 301, and transmits it to the digital camera 100. Similarly, the second microphone 305 is mounted on or disposed in proximity to the second player 304, collects the sound of the performance of the second player 304, and transmits it to the digital camera 100.

The first position sensor 303 is attached to the first microphone 302 and the second position sensor 306 is attached to the second microphone 305. Although the first position sensor 303 detects the position information of the first microphone 302, the position information of the first microphone 302 shall be equivalent to position information of the first player 301 as the sound source in this embodiment. Similarly, although the second position sensor 306 detects the position information of the second microphone 305, the position information of the second microphone 305 shall be equivalent to position information of the second player 304 as the sound source in this embodiment. In the following description, the first position sensor 303 and the second position sensor 306 are described so that the first position sensor 303 and the second position sensor 306 shall respectively detect the position information of the first player 301 and the position information of the second player 304. The first position sensor 303 may be attached to the first player 301 as a device separate from the first microphone 302. The second position sensor 306 may be attached to the second player 304 as a device separate from the second microphone 305.

The digital camera 100 receives the sound collected by the first microphone 302, the sound collected by the second microphone 305, the position information from the first position sensor 303, and the position information from the second position sensor 306 via the communication unit 254.

A change of a looking state of the image picked up by the camera system 200 in increasing a zoom magnification is similar to a change of a looking state in a case where a person moves forward on the field angle center axis (a y-axis) from the camera position toward the first player 301. In this embodiment, the zoom magnification shall increase by optical zooming by a zoom operation of the lens barrel 210 for convenience of the description.

The system controller 250 determines an estimated standing position 307 at which the looking state becomes equivalent to the image captured at the current zoom magnification. A distance 308 from the estimated standing position 307 to the first player 301 and a distance 310 from the estimated standing position 307 to the second player 304 depend on the estimated standing position 307. The direction 309 in which the performance of the first player 301 is heard at the estimated standing position 307 and the direction 311 in which the performance of the second player 304 is heard at the estimated standing position 307 also change of accordance with the estimated standing position 307. In FIG. 3A, arrows indicating directions 309 and 311 from which sounds are heard are represented by the direction in which the sounds propagate. The system controller 250 generates sounds so as to be heard at the estimated standing position 307, and generates movie data by combining the generated sounds and the captured video image.

Figure 3B:
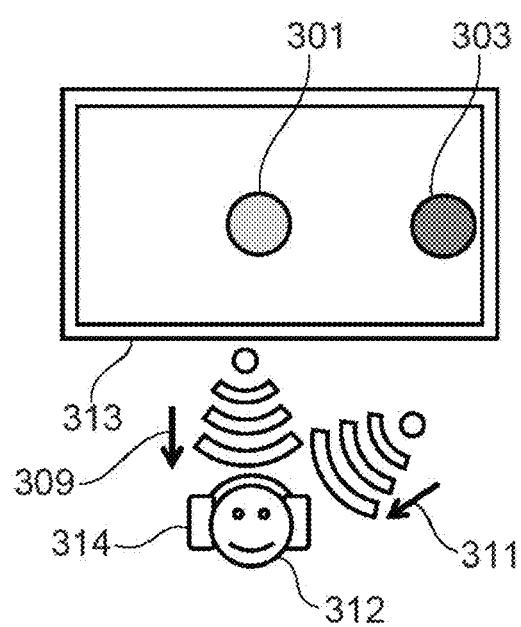
FIG. 3B is a schematic view showing a situation where a viewer watches a pickup image.

The generated movie data is transferred from the communication unit 254 to a distribution apparatus (not shown), and the distribution apparatus distributes the movie data to viewers. FIG. 3B is a schematic view showing a situation where a viewer 312 watches the distributed movie data of the music event. The viewer 312 watches the video image on a monitor 313 and hears the sounds by a headphone 314. Since the movie being viewed is generated as described above, even when the zoom magnification of the image varies, the direction in which the first player 301 is visually recognized coincides with the direction 309 from which the sound of the first player 301 is heard, and the direction in which the second player 304 is visually recognized coincides with the direction 311 from which the sound of the second player 304 is heard. In this way, even if there are a plurality of sound sources, since the hearing states of the sounds are linked to the looking state of the video image during the zoom image capturing, the viewer 312 can obtain high presence as if the viewer 312 were looking and hearing the music event while standing at the estimated standing position 307 in a music event venue.

Figure 4:
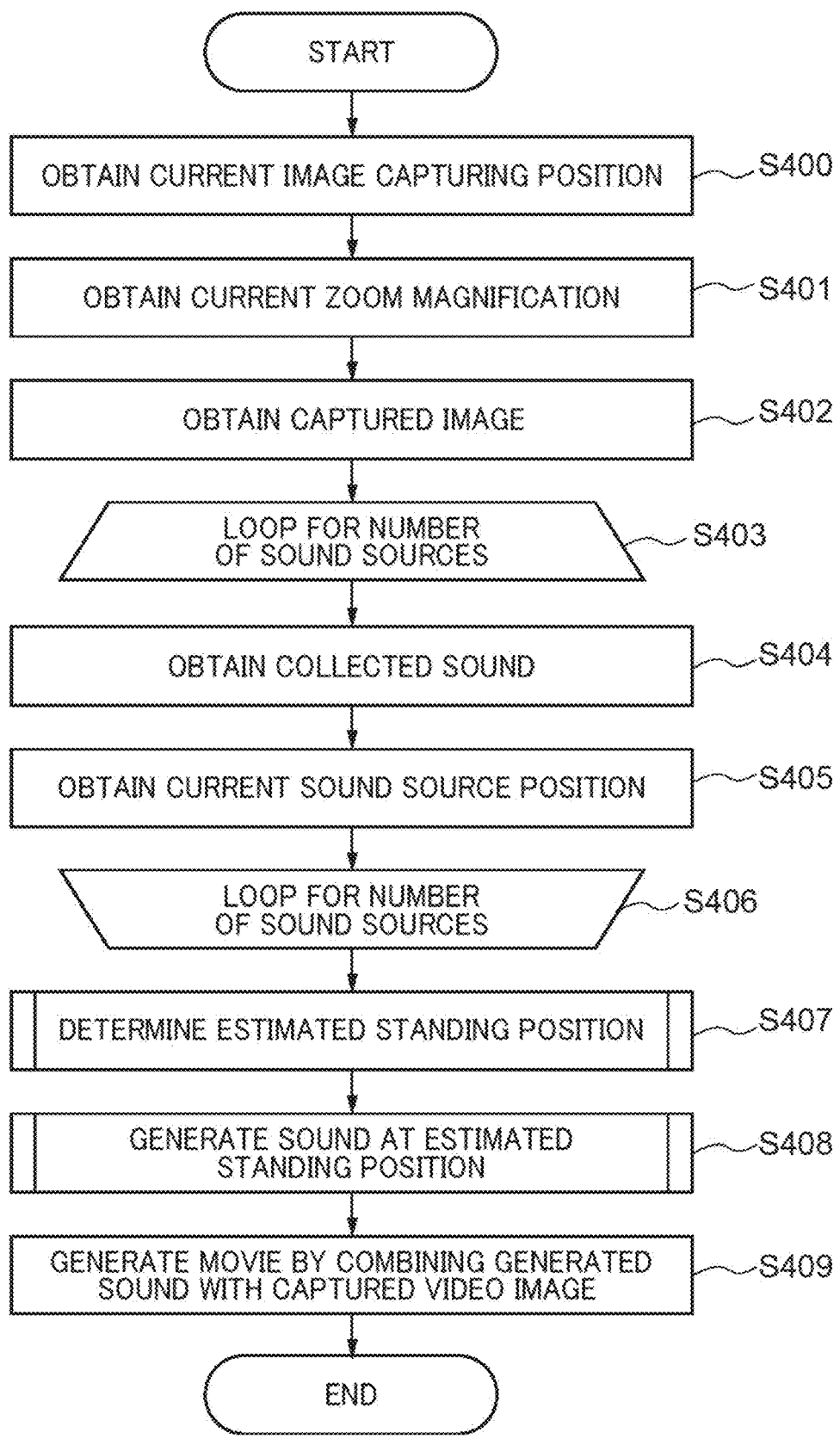
FIG. 4 is a flowchart showing a movie generation process in a first embodiment.

FIG. 4 is a flowchart showing a movie generation process executed by the camera system 200. Each process (step) indicated by an S number in the flowchart in FIG. 4 is achieved because the system controller 250 develops a predetermined program stored in the nonvolatile memory 256 onto the system memory 252 and controls an operation of each section of the camera system 200.

The process of the flowchart in FIG. 4 is periodically executed while the digital camera 100 is in a standby state or an execution state of the video image capturing. Steps S400 through S409 represent a process for one cycle. It should be noted that the system controller 250 may receive various instructions (for example, change of the zoom magnification) other than the movie generation and execute processes in response to the instructions in parallel with the process according to the flowchart in FIG. 4.

In S400, the system controller 250 obtains the current image capturing position in order to obtain the positional relationship between the sound sources (the first player 301 and the second player 304) and the image capturing apparatus (the digital camera 100). The image capturing position is the position of the digital camera 100, and the digital camera 100 is installed so as to pick up an image in the y-axis positive direction from the origin of the coordinate system 300. A user shall beforehand register the origin coordinate as the position coordinate of the digital camera 100, the y-axis as the field angle center axis in the image capturing direction, and the y-axis positive direction as the image capturing direction in the system memory 252. The system controller 250 obtains these values to find the image capturing position.

If the position or posture of the digital camera 100 can be changed, the image capturing position may be obtained from detection values obtained by detecting the position or posture. The position and posture of the digital camera 100 may be detected by a sensor like a GPS provided in the digital camera 100, or may be detected by an external device so that the detection result will be transmitted to the digital camera 100.

In S401, the system controller 250 obtains the current zoom magnification. Specifically, the system controller 250 obtains the current zoom magnification from the lens controller 204 of the lens barrel 210 via the lens-side communication terminal 206 and the camera-side communication terminal 110.

In S402, the system controller 250 reads images, which are stored by performing an image capturing operation (an operation of sequentially storing images picked up by the image capturing device 222 in the storage medium 290), from the storage medium 290. It should be noted that the system controller 250 obtains the images, which are processed in a period of the current cycle, from the storage medium 290 and stores the images in the system memory 252.

Loop for the number of sound sources between S403 and S406 indicates that processes in S404 and S405 are executed for each sound source by the number of the sound sources. In the following description for S404 and S405, the first player 301 shall be a sound source. Since the process executed for the second player 304 is similar to that for the first player 301, description thereof will be omitted.

In S404, the system controller 250 obtains the performance (sound), which is collected by the first microphone 302 and is stored in the storage medium 290, from the storage medium 290. The first microphone 302 collects the performance of the first player 301, generates sound data as a digital signal, and transmits the sound data to the digital camera 100. The system controller 250 stores the sound data obtained from the first microphone 302 via the communication unit 254 into the storage medium 290. It should be noted that the system controller 250 obtains the sound data of the first microphone 302, which is processed in the period of the current cycle, from the storage medium 290 and stores the obtained sound data in the system memory 252.

In S405, the system controller 250 obtains the current zoom magnification. As described above, since the first position sensor 303 detects the position information of the first player 301 and transmits it to the digital camera 100, the system controller 250 obtains the position information of the first player 301 as the position information of the sound source.

It should be noted that a GPS is employed as the first position sensor 303, and the first position sensor 303 transmits the obtained position information and obtained time to the digital camera 100 in parallel to the obtainment of the position information. The system controller 250 sequentially stores the position information and the obtained time received via the communication unit 254 in the storage medium 290.

The system controller 250 obtains the position information of the first player 301 in the current cycle from the storage medium 290, converts the position information into a coordinate in the coordinate system 300, and stores the coordinate in the system memory 252. When the position of the first player 301 does not change approximately, the user may input and register the position information (coordinate) of the first player 301 by operating the operation unit 270 so that the system controller 250 will obtain the coordinate.

In S407, the system controller 250 determines the estimated standing position corresponding to the image picked up at the current zoom magnification. For example, when the zoom magnification increases, the estimated standing position approaches the player in the image capturing direction as described by referring to FIG. 3A. Details of a method of determining the estimated standing position in S407 will be described later.

In S408, the system controller 250 generates a sound to be synthesized to the image so as to be heard at the estimated standing position. Details of the method of generating a sound in the S408 will be described later.

In S409, the system controller 250 generates a movie by combining the video image obtained in S402 and the sound generated in S408. Hereinafter, the movie data is generated by combining the image data and the sound data in the period processed in this cycle, and is sequentially stored in the storage medium 290. As a result, the current process (for one cycle) is finished. Although the image capturing and sound collection are performed in parallel at regular intervals in this embodiment, the processes may be performed by cutting at regular intervals after completion of the image capturing and sound collection.

Figure 5A:
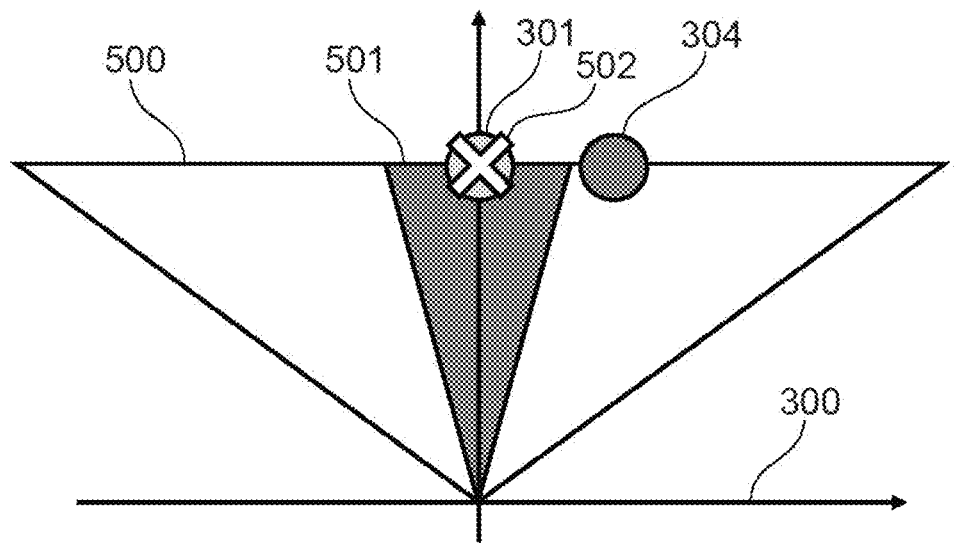
FIG. 5A and FIG. 5B are schematic views describing an asymptotic position for determining an estimated standing position.
Figure 5B:
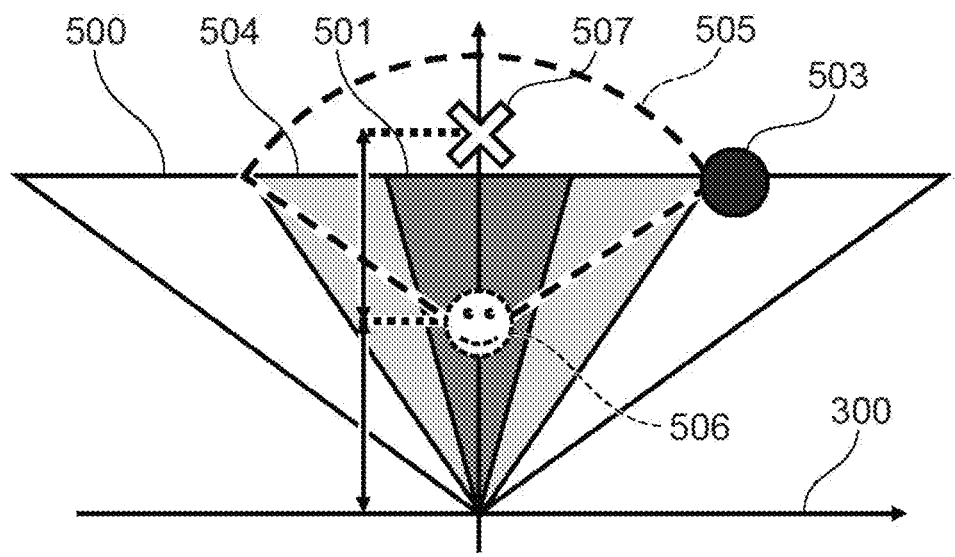

Next, details of the process in S407 will be described. FIG. 5A and FIG. 5B are views showing a method of determining an asymptotic position for obtaining an estimated standing position on the basis of a positional relationship between an image capturing field angle and a sound source. FIG. 5A is a view showing the method of determining an asymptotic position in a case where a sound source is located within the most telescopic field angle. The widest field angle 500 is a field angle of the widest end of the image capturing angle of the lens barrel 210 (the zoom magnification is equal to 1). The most telescopic field angle 501 is a field angle of the most telescopic end of the image capturing field angle of the lens barrel 210.

When there is the sound source (the first player 301) within the most telescopic field angle, a change of a looking state of an image picked up while increasing the zoom magnification is close to a change of a looking state when a person moves within the telephoto field angle and on the field angle center axis toward the sound source closest to the person. Therefore, the system controller 250 determines a position of a perpendicular line drawn from the sound source (the first player 301) to the field angle center axis as an asymptotic position 502 of the estimated standing position, and calculates the estimated standing position on the basis of the current zoom magnification and the asymptotic position 502.

FIG. 5B is a view showing a method of determining an asymptotic position in a case where a sound source is not located within the most telescopic field angle but is located within the widest field angle. The most telescopic field angle 501 and the widest field angle 500 are the same as those in FIG. 5A, and a sound source 503 is located outside the most telescopic field angle and within the widest field angle. In this case, a change of a looking state of an image picked up while increasing the zoom magnification is close to a change of a looking state when a person moves forward on the field angle center axis until the sound source 503 goes out from the field of view (becomes invisible). Thereafter, when the zoom magnification is further increased, it can be regarded that the person further advances on the field angle center axis being backed by the sound source 503 that is not included in the image.

Therefore, the system controller 250 sets the zoom magnification when the sound source 503 goes out from the captured image as a reference zoom magnification. In FIG. 5B, for example, when the sound source 503 is in contact with the field angle 504 of twice zoom, the reference zoom magnification in this case is set to twice.

The system controller 250 determines the standing position of the person when the sound source 503 goes out from the visual field 505 of the person moving on the field angle center axis as the reference standing position 506. Then, the system controller 250 determines the asymptotic position 507 so that the reference standing position 506 becomes the estimated standing position in the twice zoom that is the zoom magnification at which the sound source 503 goes out from the image. And the system controller 250 calculates the estimated standing position on the basis of the current zoom magnification and the asymptotic position 507.

Figure 6:
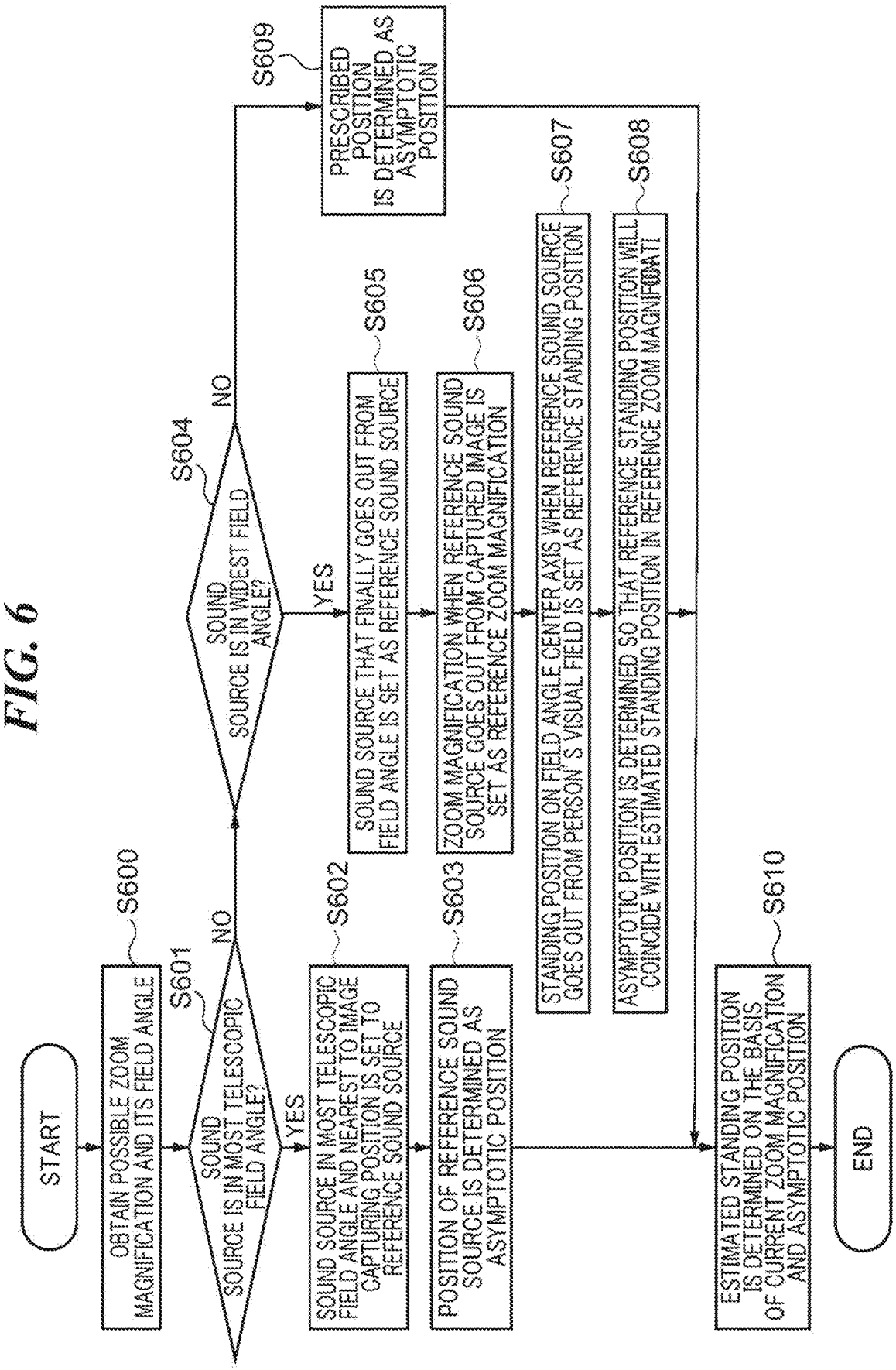
FIG. 6 is a flowchart showing a process (S407) of determining the estimated standing position.

FIG. 6 is a flowchart showing a process (S407) of determining the estimated standing position. In S600, the system controller 250 obtains a zoom magnification and an image capturing field angle that can be taken by the lens barrel 210. More specifically, the system controller 250 obtains the possible focal length of the lens barrel 210 from the lens controller 204, obtains the size of the image sensor included in the image capturing device 222 from the system memory 252, and calculates the field angle corresponding to the focal length. At this time, the system controller 250 calculates the zoom magnification by dividing the focal length at the telephoto side by the focal length at the widest angle with reference to the image capturing field angle at the focal length at the widest angle, and stores the zoom magnification and the image capturing field angle in the system memory 252.

In S601, the system controller 250 determines whether a sound source is within the most telescopic field angle. Whether a sound source is within the most telescopic field angle is determined on the basis of the zoom magnification and the image capturing field angle calculated in S600 and the sound source position obtained in S405. For example, in the case in FIGS. 5A (and FIG. 3A), since the first player 301 who is the sound source is located within the most telescopic field angle 501, it is determined that the sound source is located within the most telescopic field angle. When determining that the sound source is located within the most telescopic field angle (YES in S601), the system controller 250 executes a process in S602.

In S602, the system controller 250 sets a sound source that is located within the most telescopic field angle and is closest to the image capturing position (the position of the digital camera 100) as a reference sound source for determining the asymptotic position. Specifically, the reference sound source is set by calculation based on the possible zoom magnification, the image capturing field angle thereof, the sound source position, and the current image capturing position obtained in S400. In the case of FIG. 5A, the first player 301 who is the sound source is set as the reference sound source.

In S603, the system controller 250 determines the position of the reference sound source as the asymptotic position. In the case of FIGS. 5A (and FIG. 3A), the position of the first player 301 set as the reference sound source in S602 is determined as the asymptotic position. The system controller 250 executes a process in S610 after executing the process in S603.

When determining that no sound source is located within the most telescopic field angle in S601 (NO in S601), the system controller 250 performs the process in S604. In S604, the system controller 250 determines whether a sound source is located within the widest field angle. Specifically, whether the sound source position obtained in S405 is included within the widest field angle is determined by calculation based on the possible zoom magnification, the image capturing field angle thereof, and the current image capturing position obtained in S400. When determining that a sound source is located within the widest field angle (YES in S604), the system controller 250 executes a process in S605.

In S605, the system controller 250 sets a sound source that finally goes out from the image capturing field angle when the zoom magnification is increased as a reference sound source for determining the asymptotic position. The reference sound source is obtained by performing calculation based on the possible zoom magnification, the image capturing field angle thereof, the position information of each sound source, and the image capturing position. In S606, the system controller 250 sets the zoom magnification at which the reference sound source goes out from the captured image as the reference zoom magnification.

In S607, the system controller 250 determines the standing position of the person on the field angle center axis at which the reference sound source goes out from the visual field of the person moving on the field angle center axis as the reference standing position. In S608, the system controller 250 determines the asymptotic position so that the reference standing position becomes the estimated standing position at the reference zoom magnification. The system controller 250 executes a process in S610 after executing the process in S608.

It should be noted that FIG. 5B is an example in which the processes in S605 through S608 are performed. In the case in FIG. 5B, since no sound source is located within the most telescopic field angle (NO in S601) but the sound source 503 is located within the widest field angle (YES in S604), the sound source 503 is set as the reference sound source (S605). The zoom magnification (twice) at which the sound source 503, which is the reference sound source, goes out from the image capturing field angle is set as the reference zoom magnification (S606), and the reference standing position 506 is determined as a position on the field angle center axis when the reference sound source goes out from the human visual field (S607). A position obtained by doubling the distance from the image capturing position to the reference standing position 506 is determined as the asymptotic position 507 (S608).

When determining that no sound source is located within the widest field angle in S604 (NO in S604), the system controller 250 performs a process in S609. In S609, the system controller 250 determines a prescribed position as the asymptotic position. For example, a coordinate beforehand registered in the system memory 252 is determined as the asymptotic position. The determination of the asymptotic position is not limited to this. In the case of a configuration capable of obtaining a position of an object that is not a sound source in the image capturing field angle, the position (coordinate) of the object may be determined as the asymptotic position. The system controller 250 executes the process in S610 after executing the process in S609.

In S610, the system controller 250 determines the estimated standing position on the basis of the current zoom magnification and the asymptotic position. In the case in FIG. 5A (FIG. 3A), the system controller 250 obtains a distance by dividing the distance from the asymptotic position 502 to the image capturing position by the current zoom magnification, and determines the estimated standing position 307a as a position that is on the field angle center axis and is separated from the asymptotic position 502 toward the image capturing position by the obtained distance. When the process in S610 is executed, this process is finished.

It should be noted that the process of the flowchart in FIG. 4 including the process of the flowchart in FIG. 6 shall be periodically executed while the digital camera 100 is in the standby state or the execution state of the video image capturing. That is, the asymptotic position and the estimated standing position shall be periodically determined. However, the embodiment is not limited to such an aspect. For example, the asymptotic position may be determined before starting the image capturing, and only the determined asymptotic position may be obtained in each cycle. Moreover, the asymptotic position may be updated in response to a change of any one of the position of each sound source, the image capturing position, and the posture of the digital camera 100 as a trigger.

Figure 7:
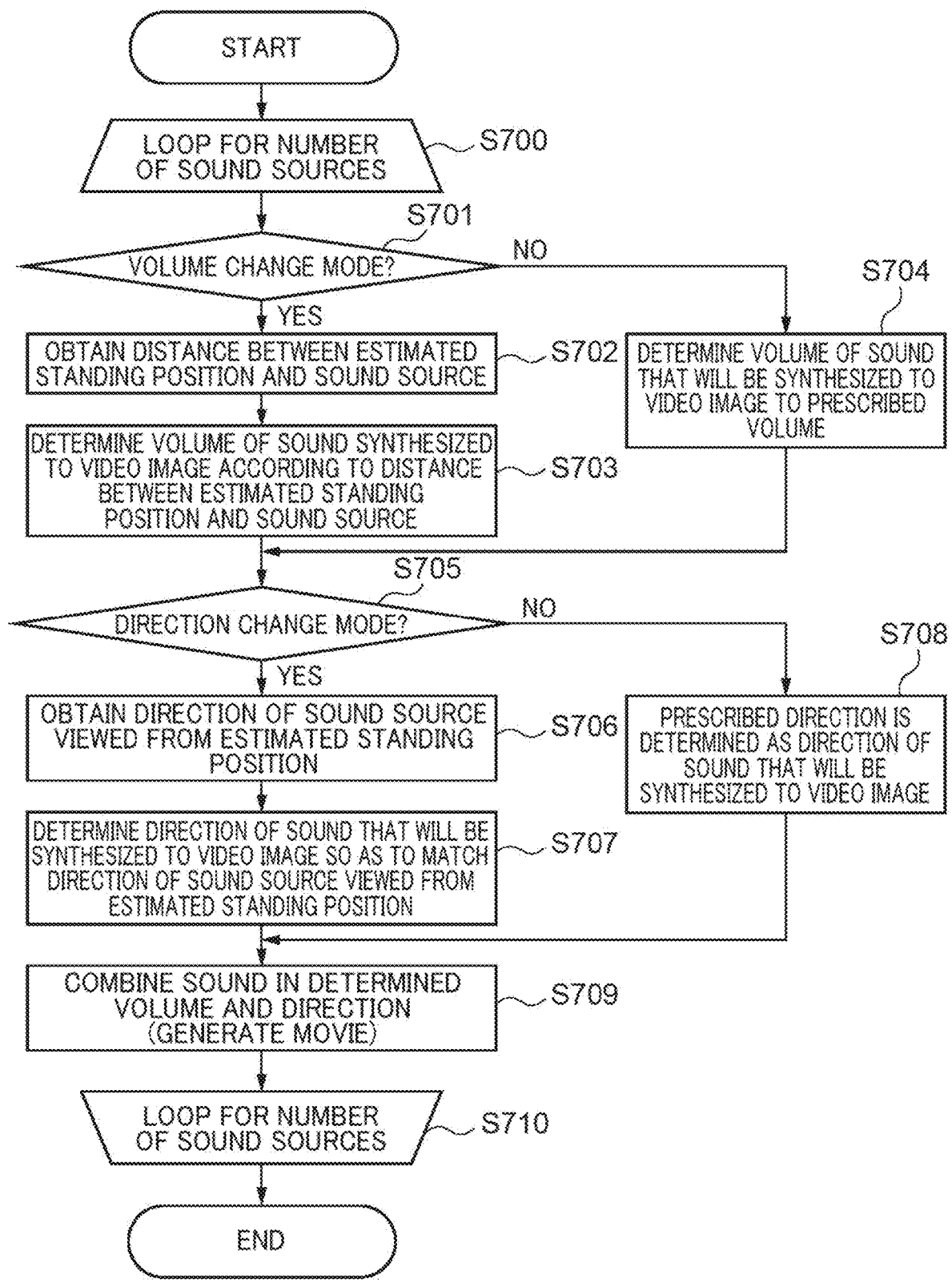
FIG. 7 is a flowchart of a process (S408) of generating a sound to be synthesized to an image.

Next, details of the process in S408 will be described. FIG. 7 is a flowchart showing the process (S408) of generating a sound to be synthesized to an image. Loop for the number of sound sources between S700 and S710 indicates that processes in S701 through S709 are executed for each sound source by the number of the sound sources.

In the following description about S701 through S709, a case where the sound of which the sound source is the first player 301 and that is collected by the first microphone 302 is recorded will be described. A similar process is performed about the sound of the second player 304 collected by the second microphone 305. In this case, in the following description, the "first player 301" is replaced with the "second player 304", the "first microphone 302" is replaced with the "second microphone 305", the "distance 308" is replaced with the "distance 310", and the "direction 309" is replaced with the "direction 311".

In S701, the system controller 250 determines whether the volume change mode, which is one of the output sound generation modes, is valid on the basis of the value of the volume change mode stored in the system memory 252. When determining that the volume change mode is valid (YES in S701), the system controller 250 executes a process in S702.

In S702, the system controller 250 obtains the distance between the estimated standing position and the sound source. For example, the system controller 250 calculates the distance 308 between the estimated standing position 307 and the sound source from the coordinate of the estimated standing position 307 obtained in S610 and the coordinate indicating the position of the first player 301 obtained in S405.

In S703, the system controller 250 determines the volume of the sound to be synthesized to the image in accordance with the distance between the estimated standing position and the sound source. In this embodiment, a function for obtaining a sound attenuation factor is determined so that the sound volume will have negative correlation to the distance between the estimated standing position and the sound source. For example, the function is determined so that the sound volume will be inversely proportional to the distance between the estimated standing position and the sound source. The volume of the sound that is come from the first microphone 302 to be synthesized to the image is determined by multiplying the attenuation factor obtained by substituting the distance 308 into this function to the volume of the sound collected by the first microphone 302. The attenuation factor can be found by another function. For example, the attenuation factor may be a reciprocal of the cube of the distance between the estimated standing position and the sound source. Further, the function used to determine the attenuation factor may be different for each microphone. The system controller 250 executes the process in S705 after executing the process in S703.

When determining that the volume change mode is not valid (is invalid) in S701 (NO in S701), the system controller 250 executes a process in S704. In S704, the system controller 250 sets the volume of the sound synthesized to the video image to a prescribed volume. For example, when the volume change mode is unavailable, the volume collected by the microphone may be determined as the prescribed volume as-is. In addition, the prescribed volume may be different for each microphone. The system controller 250 executes the process in S705 after executing the process in S704.

In S705, the system controller 250 determines whether the direction change mode, which is one of the output sound generation modes, is valid on the basis of the value of the direction change mode stored in the system memory 252. When determining that the direction change mode is valid (YES in S705), the system controller 250 executes a process in S706.

In S706, the system controller 250 obtains the direction of the sound source viewed from the estimated standing position. For example, as described above, the first position sensor 303 transmits the position information of the first player 301 to the digital camera 100. Therefore, the direction 309 of the first player 301 viewed from the estimated standing position 307 is obtained from the coordinate of the first player 301 and the coordinate of the estimated standing position 307 in the current cycle.

In S707, the system controller 250 determines the direction of the sound to be synthesized to the video so as to match the direction of the sound source as viewed from the estimated standing position. For example, the direction in which the sound collected by the first microphone 302 is synthesized with the video image is determined so as to coincide with the direction 309 in which the first player 301 is viewed from the estimated standing position 307. The system controller 250 executes the process in S709 after executing the process in S707.

When determining that the direction change mode is valid in S705 (NO in S705) 1, the system controller 250 executes a process in S708. In S708, the system controller 250 determines the direction in which the sound is synthesized to the video image as the prescribed direction. For example, when the direction change mode is invalid, the y-axis positive direction is determined as the prescribed direction as the direction in which the voice is synthesized. The prescribed direction may be different for each position of a sound source. The system controller 250 executes the process in S709 after executing the process in S708.

In S709, the system controller 250 synthesizes the sounds with the volume determined in S703 or S704 and the direction determined in S707 or S708. For example, the viewer 312 shall watch the movie (video image and sound) while wearing the headphone 314 as shown in FIG. 3B. In this case, a sound is generated through a head-related transfer function so that the sound collected by the first microphone 302 will be heard from the direction 309 of the sound source viewed from the estimated standing position 307, and the generated sound is generated as sound data at the determined volume. It should be noted that the viewer 312 may hear the sound using a sound device including two or more speaker sets instead of the headphone 314. In this case, the sound may be synthesized by adjusting the volume of the sound distributed to each speaker so that the sound will be heard from the direction of the sound source viewed from the estimated standing position.

Figure 8:
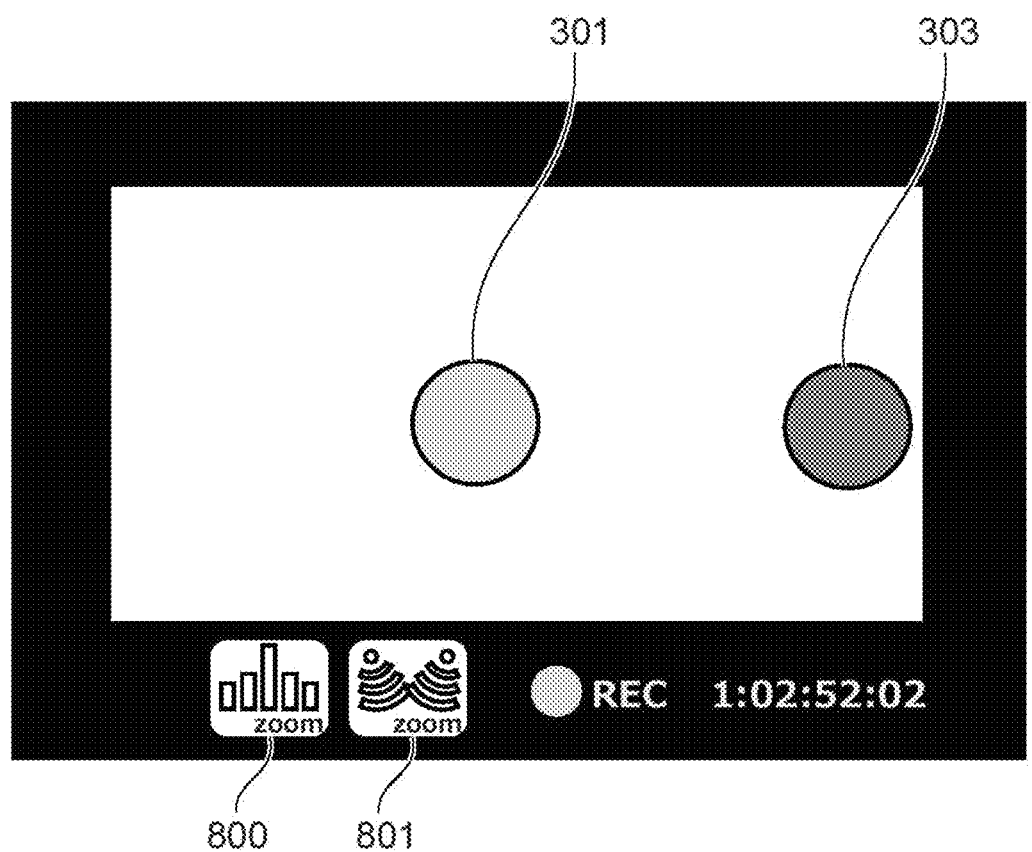
FIG. 8 is a view showing a live view display example displayed on a display unit during shooting.

Next, a designation process of the output sound generation modes in capturing an image (in recording a video image) by the digital camera 100 will be described. FIG. 8 is a view showing an LV display example displayed on the display unit 128 in capturing an image by the digital camera 100. The display unit 128 displays an icon 800 by which the user can recognize validity/invalidity of the volume change mode and an icon 801 by which the user can recognize validity/invalidity of the direction change mode. The icon 800 is equivalent to a first indicator that displays whether the process of determining the volume by the volume change mode button 183 (the first switching member) is valid or invalid. The icon 801 is equivalent to a second indicator that displays whether the process of determining the direction by the direction change mode button 184 (the second switching member) is valid or invalid. In the display example in FIG. 8, the icons 800 and 801 are highlighted (turned on) so as to indicate that both the modes are valid.

Figure 9A:
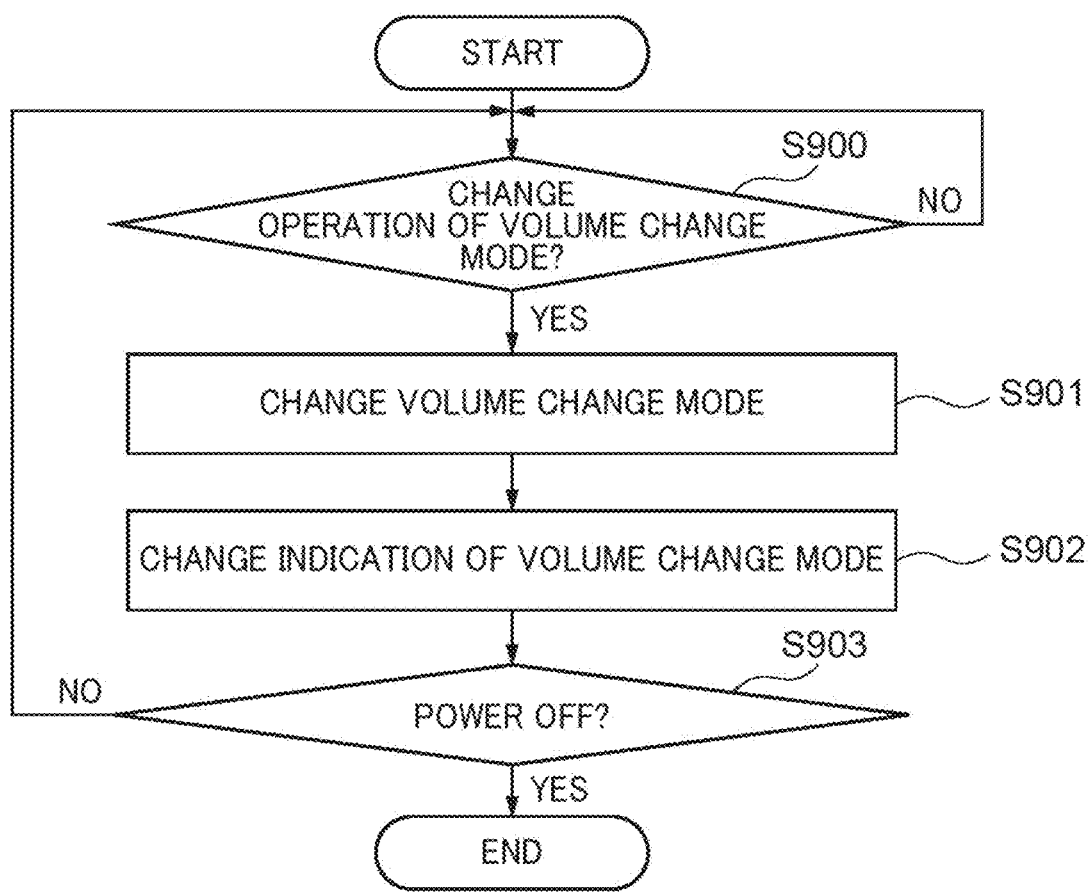
FIG. 9A is a flowchart showing a change process for a volume change mode.
Figure 9B:
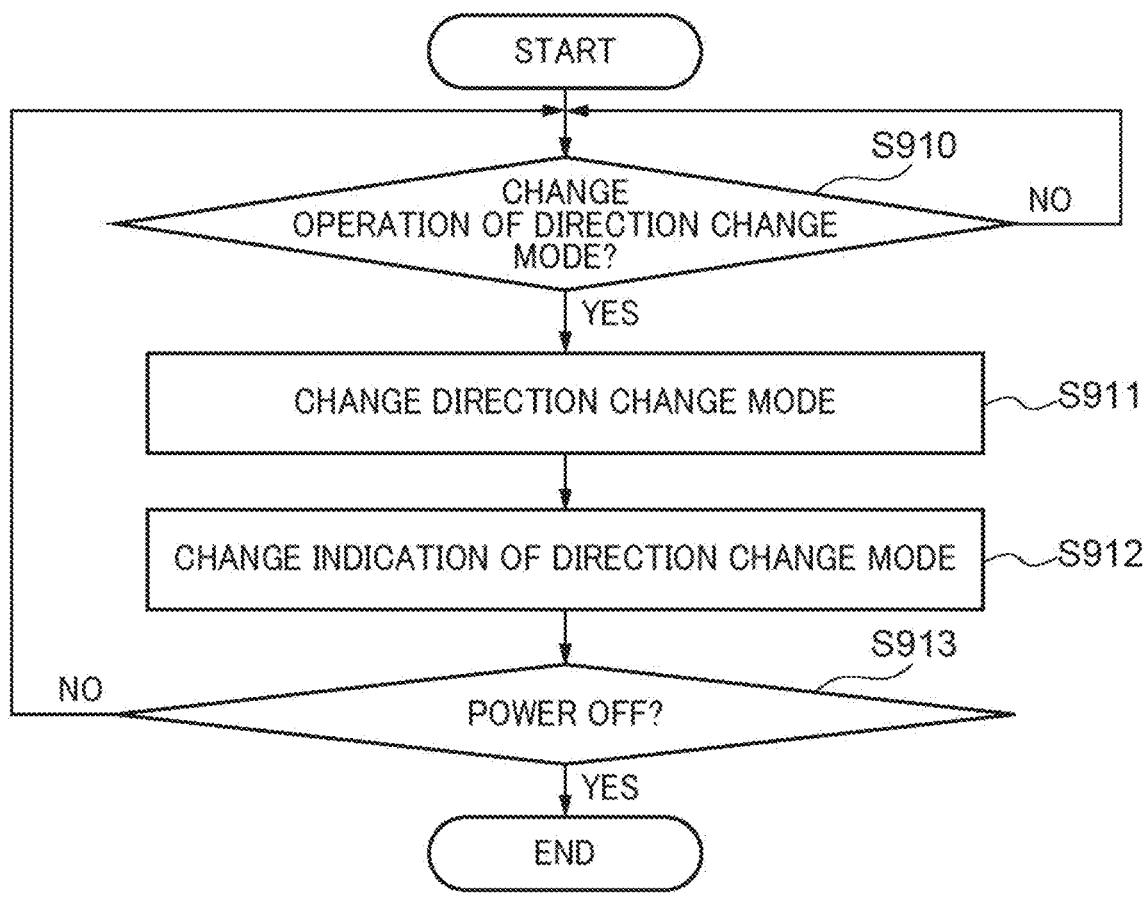
FIG. 9B is a flowchart showing a change process for a direction change mode.

FIG. 9A is a flowchart showing a change process for the volume change mode. FIG. 9B is a flowchart showing a change process for the direction change mode. Each process (step) indicated by an S number in the flowcharts in FIG. 9A and FIG. 9B is achieved because the system controller 250 develops a predetermined program stored in the nonvolatile memory 256 onto the system memory 252 and controls an operation of each section of the camera system 200.

A user can set the output sound generation modes before capturing an image by operating the volume change mode button 183 and the direction change mode button 184 while checking the icons 800 and 801 on the LV display. Moreover, the user can change the output sound generation modes while capturing a video image by operating the buttons. As a result, intention of the user can be reflected to the movie.

In S900, the system controller 250 determines whether there is a change operation of validity/invalidity of the volume change mode. Specifically, the determination in S900 is performed based on whether the volume change mode button 183 is pressed. It should be noted that validity/invalidity of the volume change mode may be changed by a touch operation to the icon 801 or by a selecting operation on a dedicated menu displayed on the display unit 128.

When determining that there is no change operation of the volume change mode (NO in S900), the system controller 250 repeats the determination in S900. When determining that there is a change operation of the volume change mode (YES in S900), the system controller 250 executes a process in S901.

In S901, the system controller 250 changes the volume change mode. The system controller 250 obtains the value indicating the current volume change mode from the system memory 252 and determines the current state of validity/invalidity of the volume change mode. The system controller 250 changes the volume change mode to invalid if it is valid, changes to the volume change mode to valid if it is invalid, and stores the changed value in the system memory 252.

In S902, the system controller 250 changes the display state of the icon 800 that displays the volume change mode. For example, when the volume change mode is valid, the icon 800 is displayed in a highlight state, and when the volume change mode is invalid, the icon 800 is displayed in a grayout state. However, the display states are not limited to these states, and the icon 800 may be changed between display (valid) and non-display (invalid).

In the S903, the system controller 250 determines whether the digital camera 100 has been powered off. When determining that the power has been turned off (YES in S903), the system controller 250 finishes this process. When determining that the power remains ON (NO in S903), the system controller 250 returns the processing to S900.

Processes in S910 through S913 in FIG. 9B relate to change of the direction change mode. Since the processes in S910 through S913 can be read as follows, descriptions thereof will be omitted. That is, the "volume change mode", the "volume change mode button 183", and the "icon 800" in the processes in S900 through S903 are respectively replaced with the "direction change mode", the "direction change mode button 184", and the "icon 801" in the processes in S910 through S913.

As described above, according to the first embodiment, since the hearing states of the sounds are linked to the looking state of the video image during the zoom image capturing, presence in viewing the movie is enhanced. Further, the user can reflect the image capturing intention to the movie by changing the output sound generation modes.

Next, a second embodiment will be described. In the first embodiment, the sound source position is specified using the signal from the position sensor attached to the microphone. In the second embodiment, a person in a captured image is regarded as a sound source, and a distance between a sound source position and an image capturing position is determined on the basis of a size of a face of the person. According to the second embodiment, it is possible to generate a movie with high presence in which hearing states of the sounds are linked to a looking state of a video image without the need to install a position sensor in a sound source.

Figure 10:
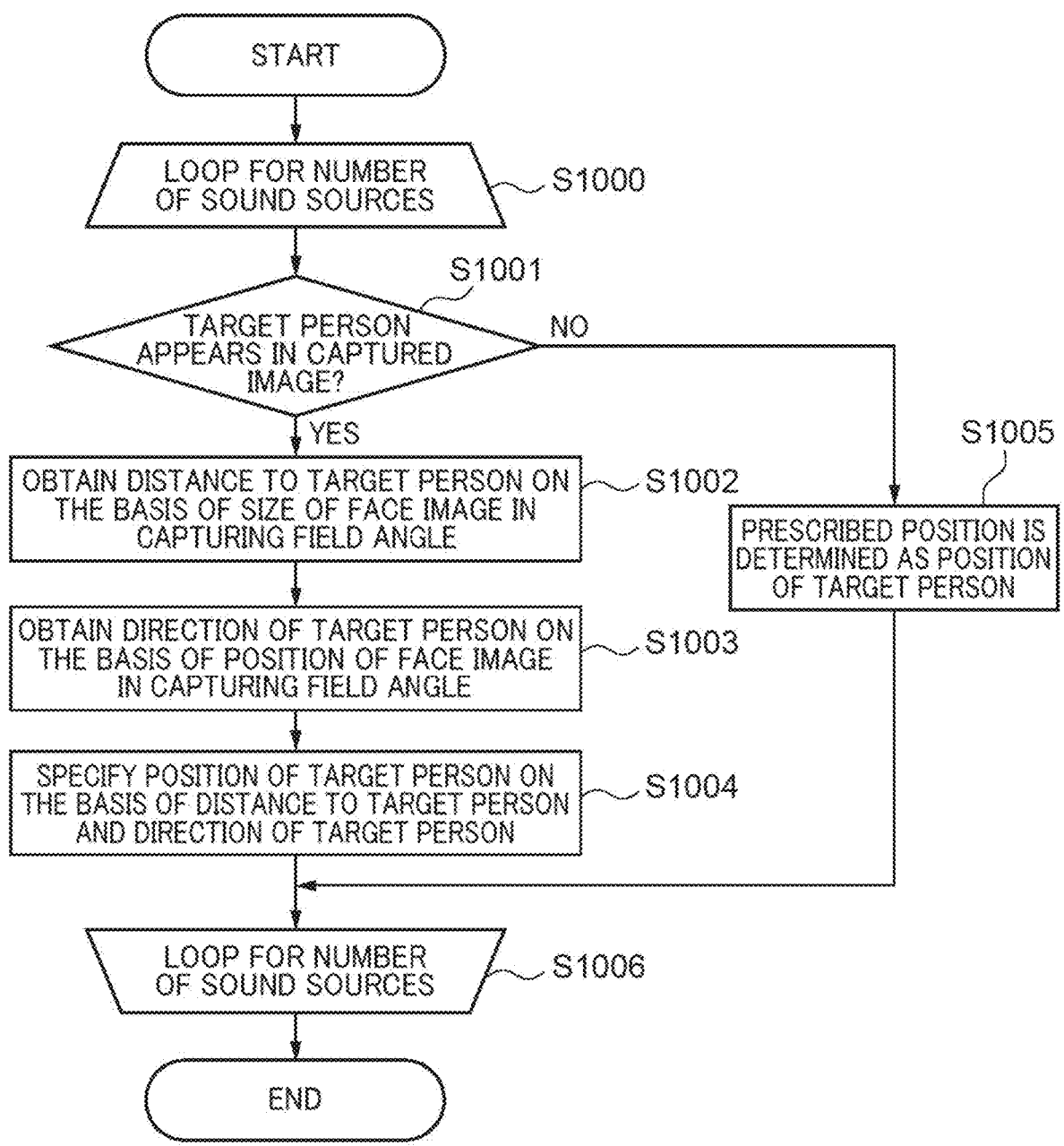
FIG. 10 is a flowchart showing a process of obtaining sound source positions in a second embodiment.

Since the configuration of the digital camera according to the second embodiment is based on the configuration (FIG. 1A, FIG. 1B, and FIG. 2) of the digital camera 100 described in the first embodiment, the description is omitted. A movie generation process in the second embodiment is executed according to the flowchart in FIG. 4 in the first embodiment, but only a content of a process in S405 of obtaining a current sound source position is different from the first embodiment. In the second embodiment, the processes of the flowcharts in FIG. 6, FIG. 7, FIG. 9A, and FIG. 9B are executed in the same manner as in the first embodiment. Therefore, in the following description, the difference from the first embodiment in the process in S405 will be mainly described, and descriptions about sections common to the first embodiment will be omitted. FIG. 10 is a flowchart showing a process of obtaining a sound source position (a process in S405 in the second embodiment). Loop for the number of sound sources between S1000 and S1006 indicates that processes in S1001 through S1005 are executed for each sound source by the number of the sound sources (the number of persons in a captured image).

In S1001, the system controller 250 determines whether a target person appears in the captured image. Specifically, a player who is a sound source shall be the target person, and a face image of the player shall be registered in the system memory 252. Then, the system controller 250 determines whether a face detected from the captured image matches the registered face image by face authentication. Since a known method can be used for face detection from the captured image and the face authentication for the detected face, a detailed description thereof will be omitted here. When determining that the face image of the target person appears in the captured image (YES in S1001), the system controller 250 executes a process in S1002.

In S1002, the system controller 250 obtains the distance from the image capturing position to the target person on the basis of the size of the face image of the target person in the captured image and the current zoom magnification. For example, a correspondence relationship between an actual distance to a person and a size of a face image in a video image is stored in advance in the system memory 252 as a correspondence table with respect to a possible zoom magnification of the lens barrel 210. The system controller 250 obtains the distance to the target person by comparing the size of the face image in the captured image and the current zoom magnification obtained in S401 (see FIG. 4) with the correspondence table. In a case where the correspondence table is used, the distance to the target person between the values defined in the table may be obtained by a complementary calculation as necessary. Instead of the correspondence table, a function capable of obtaining the distance to the target person as a continuous value may be defined, and the distance to the target person may be obtained using the function.

In S1003, the system controller 250 obtains the direction of the target person viewed from the image capturing position on the basis of the position of the face image in the image capturing field angle. Specifically, the current zoom magnification and its field angle obtained in S600 (see FIG. 6) are obtained from the system memory 252. The direction of the target person can be calculated from the field angle and the position of the face image of the target person in the image capturing field angle.

In the S1004, the system controller 250 specifies the position coordinate of the target person on the basis of the distance and direction to the target person. A position away from the image capturing position in the direction obtained in S1003 by the distance obtained in S1002 is found as the position of the target person. When the process in S1004 is executed, the sound source position obtaining process in this cycle is finished.

When determining that no target person is captured in the image capturing field angle in the determination in S1000 (NO in S1001), the system controller 250 performs a process in S1005. In S1005, the system controller 250 determines the position of the target person as a prescribed position. In this embodiment, a target person that is not included in the image capturing field angle is treated as a person (a sound source) who does not exist in the coordinate system. In this case, in the process for generating the sound for the movie in S408 (see FIG. 4), the sound of the sound source determined so as not to exist is not synthesized as the sound for the movie. However, the present invention is not limited to this. A sound source may be treated so as to be located at a position in a certain angle and a certain distance outside the image capturing field angle. When the process in S1005 is executed, the sound source position obtaining process in this cycle is finished.

As described above, according to the second embodiment, when a sound source is a person, it is possible to generate a movie by which high presence is obtained in watching because hearing states of the sounds are linked to a looking state of a video image without the need to install a position sensor in a sound source.

There may be a case where a player who is a sound source is on the center axis of the image capturing field angle but an output position of a sound played by the player is not on the same center axis. For example, the player may be an electric guitar player and the sound output position may be a position where a guitar amplifier is installed. This is because the sound of the electric guitar is generally output from a speaker (guitar amplifier) after a sound signal picked up by the electric guitar is processed through an effector and an amplifier. When the configuration of the second embodiment is used, it is possible to generate a movie that does not cause a sense of discomfort and provides high presence in watching by setting the volume change mode to be valid and by setting the direction change mode to be invalid when the sound is synthesized to the video image without using a position sensor. In the case of the configuration of the first embodiment, the position information of the player is obtained by the position sensor and the direction change mode is set to be invalid.

Although the present invention has been described in detail on the basis of the suitable embodiments, the present invention is not limited to these specific embodiments, and various configurations that do not deviate from the scope of the present invention are also included in the present invention. Furthermore, each embodiment mentioned above shows one embodiment of the present invention, and the embodiments can be combined suitably.

In the above-mentioned embodiments, the zoom operation for changing the image capturing field angle has been described on the assumption that the zoom magnification is changed by the lens barrel 210, that is, what is called optical zoom. However, the zoom operation is not limited to the optical zoom. What is called digital zoom that changes an image capturing area of the image sensor or a hybrid zoom operation that combines the optical zoom and the digital zoom may be performed. When the digital zoom is performed, the zoom magnification of the lens barrel 210 is generally set to the most telescopic side in order to suppress deterioration in image quality.

The above-described various processes described as being performed by the system controller 250 may be performed by a single hardware unit or a plurality of hardware units (e.g., a plurality of processors or circuits) may share the processes to control the entire apparatus.

In the above-described embodiments, the present invention is applied to a digital camera and a movie is generated in the digital camera. However, a configuration capable of achieving the present invention is not limited to the above-described embodiments. For example, the present invention can be achieved by an electronic apparatus, such as a smartphone, a tablet personal computer (PC), a PDA, or a mobile phone terminal, that includes an image capturing device having a zoom function. The present invention can also be achieved by a system including a camera, microphones, a GPS, and a processing apparatus. In this case, the processing apparatus obtains a video image from the camera (an image capturing apparatus), obtains sounds from the microphones, and obtains position information from the GPS. The processing apparatus may be a PC or a distribution apparatus. The processing apparatus generates a movie by performing the processes according to the flowcharts in FIG. 4, FIG. 6, and FIG. 7 using the video image captured by the image capturing apparatus, the zoom operation information, the sounds collected by the microphones, and the position information obtained by the GPS.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-076703, filed May 6, 2022, which is hereby incorporated by reference herein in its entirety.

What is claimed is:

1. A processing apparatus comprising:
   a sound obtainment unit configured to obtain sounds collected by sound collection devices;
   an image obtainment unit configured to obtain a video image captured by an image capturing device;
   a position obtainment unit configured to obtain position information of a sound source, which is subjected to a sound collection by each of the sound collection devices, with respect to the image capturing device; and
   a control unit configured to determine a position of a viewer as an estimated standing position at which a looking state becomes equivalent to an image captured by the image capturing device when an image capturing field angle of the image capturing device is changed, and to determine a direction and volume in synthesizing the sounds obtained by the sound obtainment unit based on the determined estimated standing position,
wherein the control unit determines the direction so as to coincide with a direction in which the sound source is located viewed from the estimated standing position, and determines the volume so as to increase as a distance from the estimated standing position to the sound source decreases.

2. The processing apparatus according to claim 1, wherein the position obtainment unit reads the position information of the sound source stored in advance in a storage unit from the storage unit.

3. The processing apparatus according to claim 1, further comprising a communication unit,
wherein the position obtainment unit obtains position information detected by a position detection unit included in each of the sound collection devices and transmitted from the position detection unit via the communication unit.

4. The processing apparatus according to claim 1, wherein the position obtainment unit comprises:
a face detection unit configured to detect a face of a person included in the image obtained by the image obtainment unit; and
a calculation unit configured to calculate the position information of the sound source by regarding the position of the person as the position of the sound source based on the position and the size of the face detected by the face detection unit.

5. The processing apparatus according to claim 1, wherein the control unit sets an asymptotic position on a center axis of the image capturing field angle of the image capturing device and determines the estimated standing position so as to approach the asymptotic position as a zoom magnification of the image capturing device increases.

6. The processing apparatus according to claim 5, wherein the control unit determines the asymptotic position on the center axis based on a position of a sound source closest to the image capturing device in a most telescopic field angle of the image capturing device in a case where at least one sound source is located within the most telescopic field angle of the image capturing device, and
wherein the control unit determines the asymptotic position on the center axis based on a position of a sound source that finally goes out from the image capturing field angle of the image capturing device as the zoom magnification increases in a case where at least one sound source is outside the most telescopic field angle and within a widest field angle of the image capturing device.

7. The processing apparatus according to claim 1, further comprising:
a first switching member that switches validity and invalidity of a process of determining volume of the sounds in synthesizing the sounds obtained by the sound obtainment unit to the video image in accordance with a distance from the estimated standing position to the sound source; and
a second switching member that switches validity and invalidity of a process of determining a direction in synthesizing the sounds obtained by the sound obtainment unit to the video image so as to coincide with a direction in which the sound source is located viewed from the estimated standing position.

8. The processing apparatus according to claim 7, wherein the switching between validity and invalidity of the process of determining the volume by the first switching member and the switching between validity and invalidity of the process of determining the direction by the second switching member unit are possible before and during image capturing by the image capturing device.

9. The processing apparatus according to claim 8, further comprising: a first indicator that displays whether the process of determining the volume by the first switching member is valid or invalid; and a second indicator that displays whether the process of determining the volume by the second switching member is valid or invalid.

10. The processing device according to claim 1, wherein the processing apparatus comprises any one of a digital camera, a distribution apparatus, and a personal computer.

11. The processing apparatus of claim 1, further comprising the image capturing device.

12. The processing apparatus according to claim 1, wherein the image obtainment unit obtains a video image captured by the image capturing device of an external image capturing apparatus.

13. A control method for a processing apparatus, the control method comprising:
a step of obtaining sounds collected by sound collection devices;
a step of obtaining a video image captured by an image capturing device;
a step of obtaining position information of a sound source, which is subjected to a sound collection by each of the sound collection devices, with respect to the image capturing device;
a step of determining a position of a viewer as an estimated standing position at which a looking state becomes equivalent to an image captured by the image capturing device when an image capturing field angle of the image capturing device is changed; and
a step of determining a direction and volume in synthesizing the sounds obtained to the video image obtained,
wherein the direction is determined so as to coincide with a direction in which the sound source is located viewed from the estimated standing position, and the volume is determined so as to increase as a distance from the estimated standing position to the sound source decreases.

14. A non-transitory computer-readable storage medium storing a control program causing a computer to execute a control method for a processing apparatus, the control method comprising:
a step of obtaining sounds collected by sound collection devices;
a step of obtaining a video image captured by an image capturing device;
a step of obtaining position information of a sound source, which is subjected to a sound collection by each of the sound collection devices, with respect to the image capturing device;
a step of determining a position of a viewer as an estimated standing position at which a looking state becomes equivalent to an image captured by the image capturing device when an image capturing field angle of the image capturing device is changed; and
a step of determining a direction and volume in synthesizing the sounds obtained to the video image obtained, wherein the direction is determined so as to coincide with a direction in which the sound source is located viewed from the estimated standing position, and the volume is determined so as to increase as a distance from the estimated standing position to the sound source decreases.

* * * * *